United States Patent [19]

Custer et al.

[11] Patent Number: 4,905,844

[45] Date of Patent: Mar. 6, 1990

[54] METHOD FOR MONITORING RANGES OF VOLUMETRIC FLUID FLOW

[75] Inventors: Craig Custer, Pompano Beach; William A. Nolan, Lighthouse Point, both of Fla.

[73] Assignee: CTE Chem Tec Equipment, Inc., Deerfield Beach, Fla.

[21] Appl. No.: 152,736

[22] Filed: Feb. 5, 1988

[51] Int. Cl.⁴ ............................................. G01F 1/22
[52] U.S. Cl. .............................. 73/861.53; 73/861.54
[58] Field of Search ......... 73/DIG. 3, 861.53, 861.54, 73/861.56, 861.58

[56] References Cited

U.S. PATENT DOCUMENTS

| | | | |
|---|---|---|---|
| 2,052,022 | 8/1936 | Fisher | 73/861.54 |
| 3,234,790 | 2/1966 | Ekstrom | 73/861.58 |
| 3,446,986 | 5/1969 | Cox | 73/861.54 |
| 3,759,099 | 9/1973 | McGregor | 73/861.53 |
| 4,507,976 | 4/1985 | Banko | 73/DIG. 3 |
| 4,569,233 | 2/1986 | Rosaen | 73/DIG. 3 |

Primary Examiner—Herbert Goldstein
Attorney, Agent, or Firm—M. K. Silverman

[57] ABSTRACT

A method for monitoring the existence or non-existence of a given range of volumetric fluid flows through an input channel by correlating the same to a range of sensitivity of a magnetic sensor to a pole of a magnetic armature in a valve housing. Through modification of the geometry of a cross-section of an interface between an input channel containing said armature and an output channel, the range of fluid flows to which the armature and, thereby, the magnetic sensor will respond may be calibrated both upwardly and downwardly.

4 Claims, 1 Drawing Sheet

METHOD FOR MONITORING RANGES OF VOLUMETRIC FLUID FLOW

BACKGROUND OF THE INVENTION

The present invention is concerned with a method of employing a magnetic sensor to measure a range of fluid flow through a primary channel.

While many types of magnetic valves exist in the art, these do not involve the use of a magnetic sensor to measure magnetic flux density in the pole region of a magnetic armature of a magnetic valve, in combination with the control of a cross-section of a fluid interface between a fluid input channel and fluid output channel, that is, a method of measuring a range of volumetric fluid flow through said input channel by the modification of the cross-section of the fluid interface between said input and output channels.

The value of such a method lies primarily in that it provides an economical method and means for effecting measurements which, heretofore, could only be achieved with more complex equipment and, therefore, at considerably greater cost.

SUMMARY OF THE INVENTION

The present invention relates to a method of monitoring ranges of volumetric fluid flows, employing a fluid valve having a pole magnet armature, in which the direction of movement of the armature is co-linear with the magnetic axis of said pole magnet. The method comprises the steps of: positioning a magnetic sensor within magnetic communication of a pole of said magnetic axis, defining a path of fluid flow including an input channel having said magnetic armature axially positioned therein, and having an radially oriented output channel in fluid interface with said input channel; and modifying the cross-section of said fluid interface to thereby change the axial displacement response to volumetric flow, through said input channel, of said magnetic armature to enable the use of a beneficial range of sensitivity of said magnetic sensor to magnetic flux existing in the region of the pole of said armature. Thereby, the existence or non-existence of a given range of volumetric flows through said input channel may be correlated to said range of sensitivity of said magnetic senor resulting from said modification of said cross-section of said fluid interface between said input and output channels.

It is an object of the present invention to provide a method of monitoring ranges of volumetric fluid flows.

It is another object to provide a means for monitoring ranges of volumetric fluid flows.

The above and yet other objects and advantages of the present invention will become apparent from the hereinafter set forth Detailed Description of the Invention, the Drawings, and claims appended herewith.

BRIEF DESCRIPTION OF THE DRAWINGS

FIG. 4 is a schematic view of a second modification of the cross-section of the input output interface.

FIG. 5 is a schematic view of a third modification of the cross-section of the input-output interface.

DETAILED DESCRIPTION OF THE INVENTION

Figure 1:
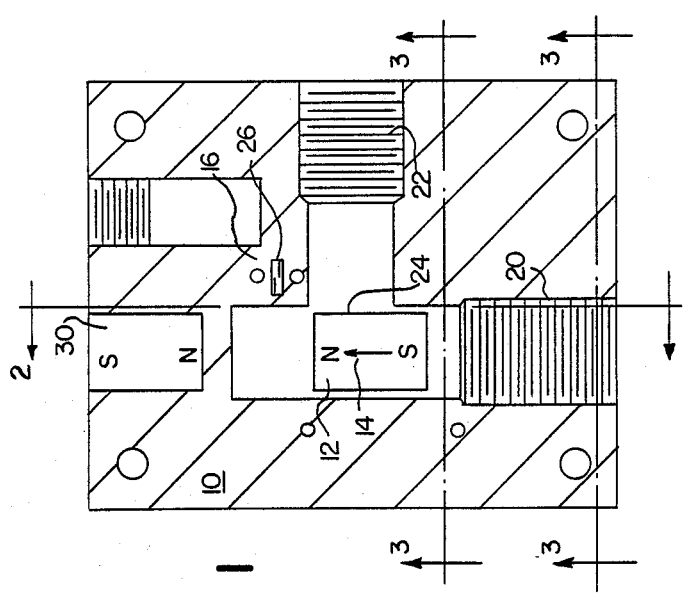
FIG. 1 is an axial cross-sectional view of a valve made in accordance with the present invention.

With reference to FIG. 1, there is shown a valve housing 10 having therein a magnetic armature 12. This armature includes a magnetic axis 14 which is defined by the indicated north pole and south pole.

Also shown in FIG. 1 is a magnetic sensor 16 which is located within magnetic communication of the north pole of said magnetic axis 14 and within a plane defined by said north pole and a line which is normal to said magnetic axis 14.

Also shown in FIG. 1 is an input channel 20, an output channel 22, and a fluid interface 24 which represents the plane of intersection between said input and output channels.

Figure 3:
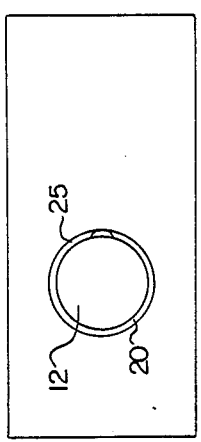
FIG. 3 is a cross-sectional view of the magnetic armature, taken along Line 3-3 of FIG. 1.

As may be noted in FIG. 3, magnetic armature 12 floats within input channel 20, and is separated from the walls thereof by an axial annular region 25. It is through region 25 that fluid from the input channel is able to reach the fluid interface 24.

Under the present inventive method, the cross-sectional geometry of fluid interface 24 is modified to take advantage of that physical characteristic of pole magnets in which the flux line thereof lose their density as they extend way from the poles in the direction of the equator of the magnet. Accordingly, after the north pole of the armature 12 passes through a reference plane 26 of the magnetic sensor 16, the magnetic sensor will rapidly lose sensitivity in that, after the pole of the armature passes the reference plane 26, the magnetic sensor will be sensing magnetic flux lines closer to the equator of the pole magnet and, thereby, lines which will register a much weaker and less reliable reading upon the magnetic sensor. Accordingly, where one wishes to employ a magnetic armature for the purpose of measuring or monitoring ranges of volumetric fluid flow, it necessary to compensate for the inherent non-linearity of magnetic flux lines as their quantitative value changes from the pole toward the equator.

It has been found that one need only employ a small axial length of displacement about the region of a pole of a magnet to measure rather large ranges of volumetric fluid flow if a method is used to compensate for the above-described non-linearity which occurs as the magnetic armature is moved past the reference plane 26 of the magnetic sensor.

Figure 2:
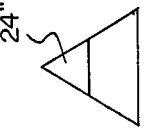
FIG. 2 is a cross-sectional view of the modified interface between the input and output channel, taken along Line 2-2 of FIG. 1.
Figure 2:
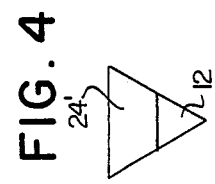
Figure 2:
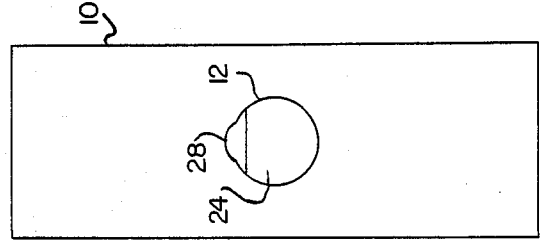

In the present invention, it has been found that such non-linearity can be effectively compensated for by modifying the fluid interface 24 between said input and output channels such that a large order increase of volumetric flow to the input channel will bring about a much lesser order of fluid flow across said interface 24. The changing of the axial displacement response of the armature, to increased input channel volumetric flow, can be facilitated by widening out the fluid interface 24, in a manner shown by region 28 in FIG. 2. It is to be appreciated that such widening may be far more pronounced and may approach a triangular cross-section somewhat ofthe type shown in FIG. 4. From the exaggerated view of FIG. 4, it may be appreciated that a geometrically increased amount of volumetric fluid flow into input channel 20, and through axially annular region 25 about the armature 12, will then be necessary to cause a fluid flow that will cause armature 12 to lift to a higher level within interface 24. In effect, the arrangement of FIG. 4 may be thought of in terms of imposing a mechanical analog of a logarithmic scale upon the volumetric fluid flow from input channel 20 such that, for example, a tenfold increase in fluid flow to the input channel may bring about only a threefold axial displacement response to the armature 12 relative to the reference plane 26 of the magnetic 16, thereby keeping the pole of the armature within the region of sensitivity of the sensor 16.

Further control of the movement of the magnetic armature may be obtained through the use of an external calibrating magnet 30 which, in one embodiment, consists of a pole magnet having the opposite polarity of that of armature 12. Accordingly, by advancing calibration pole magnet 30 closer to magnetic armature 12, higher flow rates will be required to bring about a given axial displacement response of armature 12 relative to reference plane 26 of the magnetic sensor 16.

It is to be appreciated that situations may exist in which one may wish to use the magnetic armature sensor to obtain enhanced response to very small changes in volumetric fluid flows. In such instances, one may use a cross-section similar to that shown in FIG. 5, such that the magnetic sensor then becomes sensitive to very small ranges of volumetric flow, as opposed to very large ranges thereof.

In a preferred embodiment, the magnetic sensor 16 comprises a Halleffect semiconductor, this being a semiconductor in which the gating function thereof is effected by the presence of magnetic flux lines. However, it is to be appreciated that other types of magnetic sensors may be employed within the scope of the instant method and system.

While there has been herein shown and described the preferred embodiment of the present invention, it is to be understood the invention may be embodied otherwise than is herein illustrated and described and that in said embodiment, certain changes in the details of construction, and in the form of arrangement of parts may be made without departing from the underlying idea or principles of this invention within the scope of the appended claims.

Having thus described our invention, what we claim as new, useful and non-obvious and, accordingly, secured by Letters Patent of the United States is:

1. A method of monitoring ranges of volumetric fluid flows employing a fluid sensor having a pole magnet armature in which the direction of movement of the armature is co-linear with a magnetic axis of said pole magnet armature, in which the method comprises the steps of:
    (a) positioning a magnetic sensor within magnetic communication of a pole of the said magnetic axis;
    (b) defining a path of fluid flow, said path including an input channel having said pole magnet armature axially positioned therein, and having a radially oriented output channel in fluid interface with said input channel;
    (c) selectably modifying a cross-section of said fluid interface to change the pressure across said interface to correspondingly change the axial displacement response of said armature to volumetric flow occurring through said input channel to thereby enable the use of a beneficial range of sensitivity of said magnetic sensor to magnetic flux existing in concentration in the region of said pole of said armature; and
    (d) employing an axially located calibration magnet to control the movement of said magnetic armature as a function of fluid flow from the input channel and against said armature,
whereby given range of volumetric flow through said input channel and across said interface to said output channel may be sensed within said beneficial range of sensitivity of said magnetic sensor resulting from said modification of said cross-section of said fluid interface.

2. The method as recited in claim 1 in which said modifying step comprises the step of increasing the area of said cross-section of said interface nearest to said magnetic sensor when one desires to increase the range of volumetric fluid flows to which said sensor will respond.

3. The method as recited in claim 1 in which said modifying step comprises the step of decreasing that the area of said cross-section of said interface nearest to said magnetic sensor when one desires to decrease the range of volumetric fluid flows to which said sensor will respond.

4. A system for monitoring ranges of volumetric fluid flows, comprising:
    (a) a magnetic sensor positioned within magnetic communication of a pole of a magnetic axis;
    (b) a valve body defining a path of fluid flow including an input channel having a magnetic armature having a magnetic pole axially moveably positioned therein, and having a radially oriented output channel having a fluid interface with said input channel, said armature and said magnetic axis coaligned with an axis of reciprocation of said armature; and
    (c) a calibration magnet located axially to, and in magnetic communication with, said pole of said armature, to control the movement of said armature as a function of fluid flow from said input channel against that surface of said armature opposite to said region of said pole of said armature.

* * * * *